United States Patent
Vazquez et al.

(10) Patent No.: US 9,705,789 B1
(45) Date of Patent: *Jul. 11, 2017

(54) METHOD AND APPARATUS FOR HANDLING MULTICAST TRAFFIC

(71) Applicant: Marvell World Trade Ltd., St. Michael (BB)

(72) Inventors: Marcos Martinez Vazquez, Barcelona (ES); Agustin Badenes Corella, Valencia (ES)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,125

(22) Filed: Feb. 25, 2016

Related U.S. Application Data

(63) Continuation of application No. 13/350,212, filed on Jan. 13, 2012, now Pat. No. 9,300,571.

(60) Provisional application No. 61/432,456, filed on Jan. 13, 2011.

(51) Int. Cl.
   *H04L 12/753* (2013.01)
   *H04L 12/751* (2013.01)
   *H04L 12/18* (2006.01)

(52) U.S. Cl.
   CPC ............ *H04L 45/48* (2013.01); *H04L 12/185* (2013.01); *H04L 12/1886* (2013.01); *H04L 45/02* (2013.01)

(58) Field of Classification Search
   CPC ... H04L 12/185; H04L 12/2838; H04L 45/16; H04L 45/26
   See application file for complete search history.

(56) References Cited

U.S. PATENT DOCUMENTS

| | | | |
|---|---|---|---|
| 6,549,513 B1* | 4/2003 | Chao | H04L 45/00 370/227 |
| 6,944,681 B1* | 9/2005 | Christensen | H04L 12/403 710/17 |
| 7,016,351 B1 | 3/2006 | Farinacci et al. | |
| 7,539,169 B1* | 5/2009 | O'Hara, Jr. | H04W 48/06 370/338 |

(Continued)

FOREIGN PATENT DOCUMENTS

WO   WO 2006/115487 A1   11/2006
WO   WO 2007/015822 A1   2/2007

OTHER PUBLICATIONS

International Search Report and Written Opinion of International Searching Authority, mailed Jun. 5, 2012 in counterpart International Application No. PCT/IB2012/000237.

*Primary Examiner* — Khaled Kassim

(57) ABSTRACT

Aspects of the disclosure provide method and apparatus for managing multicast traffic in a domain, such as a G.hn domain. A method includes storing, at a first node of a domain, a plurality of next nodes for transmitting messages in the domain, forwarding, from the first node to the plurality of next nodes, a probe message transmitted from a second node in response to a request from a third node to join a group to receive a multicast flow that enters the domain from the second node, and storing, at the first node, a list of nodes in association with the multicast flow. The list of nodes is determined at least in part based on a path through which the probe message is transmitted from the second node to the third node.

16 Claims, 8 Drawing Sheets

(56) References Cited

U.S. PATENT DOCUMENTS

| | | | |
|---|---|---|---|
| 7,969,980 B1* | 6/2011 | Florit | H04L 12/185 370/390 |
| 8,005,054 B2 | 8/2011 | Isozu | |
| 8,385,341 B2* | 2/2013 | Kern | H04L 12/4658 370/390 |
| 2002/0021680 A1* | 2/2002 | Chen | H04L 12/5695 370/331 |
| 2003/0061481 A1* | 3/2003 | Levine | H04L 9/0836 713/163 |
| 2003/0072271 A1* | 4/2003 | Simmons | H04L 1/1614 370/255 |
| 2003/0221962 A1 | 12/2003 | Ingenhoven et al. | |
| 2006/0088031 A1* | 4/2006 | Nalawade | H04L 12/185 370/390 |
| 2006/0098607 A1 | 5/2006 | Zeng et al. | |
| 2006/0187873 A1 | 8/2006 | Friday et al. | |
| 2006/0221962 A1* | 10/2006 | Previdi | H04L 12/1836 370/390 |
| 2006/0253488 A1* | 11/2006 | Akaiwa | H04M 1/7253 |
| 2007/0076633 A1* | 4/2007 | Sin | H04L 12/18 370/254 |
| 2007/0076703 A1* | 4/2007 | Yoneda | H04L 12/1836 370/389 |
| 2007/0091864 A1* | 4/2007 | Honjo | H04W 48/20 370/338 |
| 2007/0140107 A1 | 6/2007 | Eckert et al. | |
| 2007/0140241 A1* | 6/2007 | Asbun | H04L 12/1881 370/390 |
| 2007/0147411 A1* | 6/2007 | Bijwaard | H04L 12/185 370/432 |
| 2007/0177594 A1* | 8/2007 | Kompella | H04L 12/185 370/390 |
| 2008/0205394 A1* | 8/2008 | Deshpande | H04L 12/1854 370/390 |
| 2008/0222277 A1* | 9/2008 | Park | H04L 12/185 709/223 |
| 2009/0046583 A1* | 2/2009 | Towster | H04L 41/0896 370/232 |
| 2009/0052448 A1* | 2/2009 | Ramakrishnan | H04L 12/1886 370/390 |
| 2009/0052449 A1* | 2/2009 | Ramakrishnan | H04L 12/1886 370/390 |
| 2009/0070422 A1* | 3/2009 | Kashyap | H04L 12/185 709/204 |
| 2009/0135820 A1* | 5/2009 | Suzuki | H04L 45/02 370/390 |
| 2009/0147698 A1* | 6/2009 | Potvin | H04L 45/02 370/254 |
| 2009/0190587 A1* | 7/2009 | Zhao | H04L 12/18 370/390 |
| 2009/0245248 A1 | 10/2009 | Arberg et al. | |
| 2009/0303902 A1* | 12/2009 | Liu | H04L 12/189 370/254 |
| 2010/0002697 A1* | 1/2010 | Krishnan | H04L 12/1836 370/390 |
| 2010/0074158 A1 | 3/2010 | Ewing et al. | |
| 2010/0157889 A1* | 6/2010 | Aggarwal | H04L 45/125 370/328 |
| 2011/0019534 A1* | 1/2011 | Ramakrishnan | H04L 45/00 370/217 |
| 2011/0058567 A1* | 3/2011 | Wijnands | H04L 12/18 370/401 |
| 2011/0238854 A1* | 9/2011 | Fang | H04N 21/26616 709/231 |
| 2011/0249551 A1* | 10/2011 | Rollins | H04L 12/437 370/222 |
| 2011/0280246 A1* | 11/2011 | Isozu | H04L 45/10 370/400 |
| 2012/0030150 A1* | 2/2012 | McAuley | H04L 45/02 706/12 |
| 2012/0039334 A1 | 2/2012 | Mehta et al. | |
| 2012/0147885 A1* | 6/2012 | Johri | H04L 12/1854 370/390 |

* cited by examiner

| SOURCE NODE \ PRESENT NODE | A | B | C | D | E | F | G | H |
|---|---|---|---|---|---|---|---|---|
| A | $L_{A-A}$ | $L_{A-B}$ | $L_{A-C}$ | $L_{A-D}$ | $L_{A-E}$ | $L_{A-F}$ | $L_{A-G}$ | $L_{A-H}$ |
| B | $L_{B-A}$ | $L_{B-B}$ | $L_{B-C}$ | $L_{B-D}$ | $L_{B-E}$ | $L_{B-F}$ | $L_{B-G}$ | $L_{B-H}$ |
| C | $L_{C-A}$ | $L_{C-B}$ | $L_{C-C}$ | $L_{C-D}$ | $L_{C-E}$ | $L_{C-F}$ | $L_{C-G}$ | $L_{C-H}$ |
| D | $L_{D-A}$ | $L_{D-B}$ | $L_{D-C}$ | $L_{D-D}$ | $L_{D-E}$ | $L_{D-F}$ | $L_{D-G}$ | $L_{D-H}$ |
| E | $L_{E-A}$ | $L_{E-B}$ | $L_{E-C}$ | $L_{E-D}$ | $L_{E-E}$ | $L_{E-F}$ | $L_{E-G}$ | $L_{E-H}$ |
| F | $L_{F-A}$ | $L_{F-B}$ | $L_{F-C}$ | $L_{F-D}$ | $L_{F-E}$ | $L_{F-F}$ | $L_{F-G}$ | $L_{F-H}$ |
| G | $L_{G-A}$ | $L_{G-B}$ | $L_{G-C}$ | $L_{G-D}$ | $L_{G-E}$ | $L_{G-F}$ | $L_{G-G}$ | $L_{G-H}$ |
| H | $L_{H-A}$ | $L_{H-B}$ | $L_{H-C}$ | $L_{H-D}$ | $L_{H-E}$ | $L_{H-F}$ | $L_{H-G}$ | $L_{H-H}$ |

METHOD AND APPARATUS FOR HANDLING MULTICAST TRAFFIC

CROSS-REFERENCE TO RELATED APPLICATION

This application is a continuation of U.S. application Ser. No. 13/350,212, filed on Jan. 13, 2012, which claims the benefit of U.S. Provisional Application No. 61/432,456, filed on Jan. 13, 2011. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multicast traffic may enter a home network. In an example, multimedia stream data corresponding to a TV channel is multicasted to a plurality of home networks where the TV channel is selected by one of the devices in the home networks. Multimedia stream data typically enters a home network from an entry device of the home network, such as a router, and is subsequently transmitted to another device via the home network, such as a set top box, in order to play the multimedia stream data on a TV, for example.

SUMMARY

Aspects of the disclosure provide method and apparatus for managing multicast traffic in a domain, such as a G.hn domain. A method includes storing, at a first node of a domain, a plurality of next nodes for transmitting messages in the domain, forwarding, from the first node to the plurality of next nodes, a probe message transmitted from a second node in response to a request from a third node to join a group to receive a multicast flow that enters the domain from the second node, and storing, at the first node, a list of nodes in association with the multicast flow. The list of nodes is determined at least in part based on a path through which the probe message is transmitted from the second node to the third node.

To forward the probe message, the method includes including identification of the first node in the probe message. Then, the method includes receiving a path indication message informing the path determined by the third node based on the included identification in the probe message.

According to an embodiment of the disclosure, the method includes storing, at the first node of the domain, a broadcast routing table that associates the plurality of next nodes with the second node.

According to another aspect of the disclosure, the method includes storing, at the first node of the domain, a unicast routing table that associates a next node with the third node. Further, the method includes combining the next node into the list of nodes in association with the multicast flow.

Further, in an embodiment, the method includes receiving a leaving message informing the third node leaving the group, and updating the list of nodes in association with the multicast flow in response to the leaving message.

Aspects of the disclosure provide an apparatus. The apparatus includes an interface to a transmitting medium that couples the apparatus as a first node in a domain. The apparatus further includes a memory configured to store a plurality of next nodes for transmitting messages in the domain, and a controller. The controller is configured to control the interface to forward, according to the plurality of next nodes, a message transmitted from the second node in response to a request from a third node to join a group to receive a multicast flow that enters the domain from the second node, determine, at least in part based on a path through which the message is transmitted from the second node to the third node, a list of nodes, and control the memory to store the list of nodes in association with the multicast flow.

BRIEF DESCRIPTION OF THE DRAWINGS

Various embodiments of this disclosure that are proposed as examples will be described in detail with reference to the following figures, wherein like numerals reference like elements, and wherein:

FIG. 1C shows a broadcast routing table example according to an embodiment of the disclosure;

DETAILED DESCRIPTION

Figure 1A:
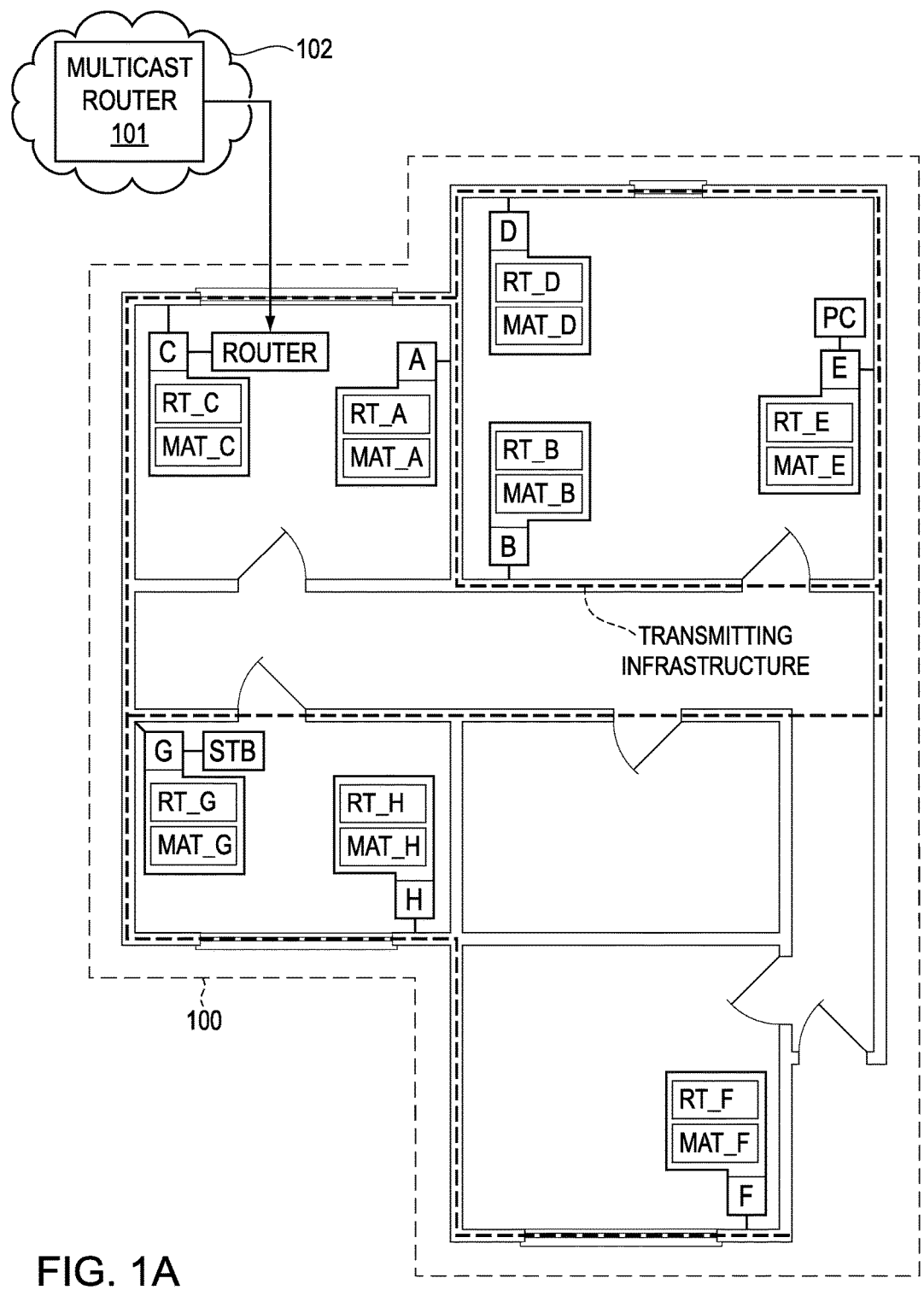
FIG. 1A shows a block diagram of a domain 100 according to an embodiment of the disclosure.

FIG. 1A shows a diagram of a domain 100 according to an embodiment of the disclosure. In the FIG. 1A example, the domain 100 is a home network domain, such as a home network domain according to a G.hn standard. The domain 100 includes a plurality of nodes, such as nodes A-H, coupled together. According to an aspect of the disclosure, the domain 100 is configured to handle multicast flows at logic link control (LLC)-layer in a per-domain basis.

According to an aspect of the disclosure, the domain 100 is established based on one or more transmitting infrastructures, such as power line grid, phone lines, coaxial cable, and the like. The transmitting infrastructures include transmitting media, such as various wires, that couple the plurality of nodes together to transmit signals among the plurality of nodes. In an example, the domain 100 is established based on a single transmitting infrastructure that couples the plurality of nodes together. In another example, the domain 100 is established based on two transmitting infrastructures that respectively couple a subset of the plurality of nodes, and at least one of the plurality of nodes is coupled to both transmitting infrastructures.

Specifically, in an embodiment, a building unit includes a power line grid of power supply wires that distributes electrical power to, for example, wall plugs in the building unit. Further, electrical appliances, such as personal computer (PC), television, set-top box (STB), washing machine, rice cooker, blender, gaming console, modem, router, and the like, in the building unit have respective power cables plugged into the wall plugs, or plugged into any extension connector connected to the wall plug in the building unit.

In an example, the electrical power is carried and distributed in the form of alternating current (AC) power. For example, the power line grid carries and distributes a sinusoidal voltage signal having a predetermined frequency, such as 50 Hz, 60 Hz, and the like. In an example, an electrical appliance includes a power module configured to convert the sinusoidal voltage signal to an appropriate form to provide power to circuits internal to the electrical appliance.

Further, according to an embodiment of the disclosure, the power line grid is used to carry communication signals, such as orthogonal frequency division multiplexing (OFDM) signals, and the like, in the relatively high frequency ranges, such as in the MHz ranges. Then, multiple electrical appliances in the building unit are configured to communicate via the power line grid and form the plurality of nodes in the domain 100. In an example, an electrical appliance includes a communication module coupled to the power line grid to form a node. In general, the communication module can be implemented as an internal module of the electrical appliance, or can be implemented in a separate device that is suitably coupled to the electrical appliance.

Figure 1B:
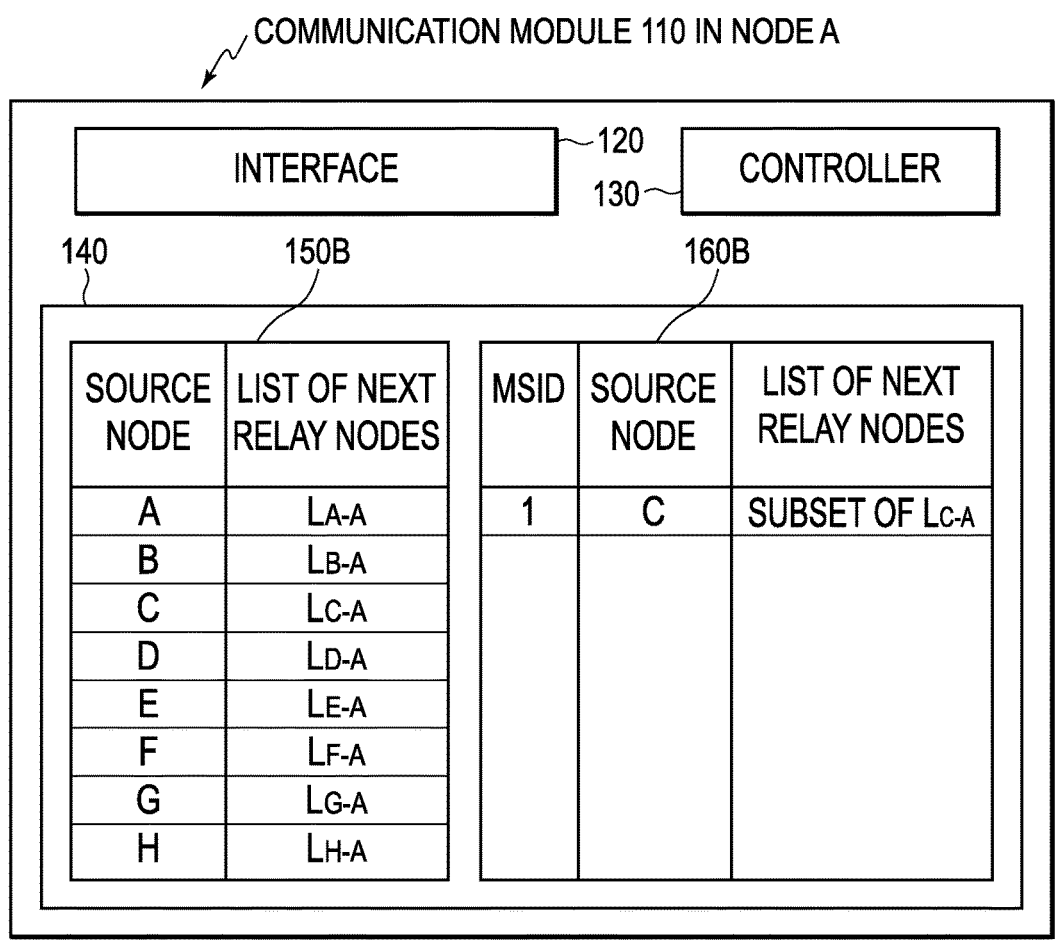
FIG. 1B shows a block diagram of a communication module of a node according to an embodiment of the disclosure.

FIG. 1B shows a block diagram of a communication module 110 at node A according to an embodiment of the disclosure. In an embodiment, the communication module 110 includes an interface 120 coupled to a transmitting infrastructure, such as a power line grid. The interface 120 is configured to transmit communication signals into the coupled transmitting infrastructure and is configured to receive communication signals transmitted by other nodes from the coupled transmitting infrastructure. Further, the communication module 110 includes a controller 130 configured to provide communication control. In an example, the controller 130 is configured to control the communication according to a communication protocol. The communication module 110 also includes a memory 140 configured to store necessary information that the controller 130 may use for communication control. The controller 130 can be implemented as logic circuits or can be implemented as a processor executing software instructions.

According to an aspect of the disclosure, the domain 100 is configured to identify multicast traffic and manage the multicast traffic at logic link control (LLC) layer (also referred to as level 3). In an example, a multicast flow of multicast packets enters the domain 100 via an edge node, such as edge node C, of the domain 100 that is suitably coupled to a network, such as a network 102, that is external to the domain 100. In the FIG. 1A example, the network 102 includes a multicast router 101 that is suitably coupled with the edge node C. The edge node C and the multicast router 101 can use any suitable policy, protocol, and standard, such as Internet Group Management Protocol (IGMP), Multicast Listener Discovery (MLD), and the like to enable the multicast flow to enter the domain 100.

Within the domain 100, multicast flows are handled at the LLC layer in a per-domain basis, such as per G.hn domain basis. For example, the edge node C can use any suitable techniques, such as analysis of IGMP/MLD frames, and the like to identify a multicast flow. The edge node C translates upper-layer IGMP/MLD-based multicast group memberships into LLC-level multicast group membership. The edge node C is also configured to identify and manage a group of nodes in the domain 100 to receive the multicast flow.

Specifically, in an embodiment, multicast packets includes information, such as a multicast group address (MULTICAST_IP) and the like, that can be used to identify the multicast flow. The edge node C examines suitable fields of the multicast packets to identify the multicast flow. In an embodiment, the edge node C provides a unique identifier for the multicast flow in the domain 100. Then, the multicast flow is managed at the logic link control layer in the domain 100 in order to guarantee its delivery, avoid useless transmission, and enable suitable traffic control for the multicast flow.

According to an aspect of the disclosure, the domain 100 is configured to setup a dedicated transmission path in association with a multicast flow to transmit the multicast flow. In an embodiment, the dedicated transmission path is determined by a single node in the domain 100 that is aware of the topology of the domain 100, such as a domain master of the domain 100. In another embodiment, the dedicated transmission path is determined by various nodes in the domain 100 in response to a message, such as a probe message.

According to an embodiment of the disclosure, the domain 100 is configured to perform unicast and broadcast at LLC layer. Further, the domain 100 is configured to reuse at least one of the unicast routing information and the broadcast routing information to determine the dedicated transmission path to route multicast traffic.

Specifically, in an example, each node includes a routing table (RT) at the node and a multicast address table (MAT). In an embodiment, the routing table is a broadcast routing table. In another embodiment, the routing table is a unicast routing table. Further, the node determines entries of the MAT based on the information in the RT to route multicast traffic.

In the FIG. 1B example, the memory 140 stores a broadcast routing table (BRT) 150B, and a multicast address table (MAT) 160B.

According to an embodiment of the disclosure, the BRT 150B is determined by a domain master. The domain master can use any suitable technique to learn domain topology, and determine broadcast routing trees in the domain. In an embodiment, the broadcast routing trees can be stored in a table. FIG. 1C shows a table of a full broadcast routing table (FBRT) 170 that is determined by a domain master. In the FIG. 1C example, the FBRT 170 includes a matrix of node lists for the eight nodes in FIG. 1A. The matrix includes a first dimension of eight source nodes and a second dimension of eight present nodes. Each element in the matrix corresponds to a source node and a present node. The element includes a list of next relay nodes of the present node to broadcast a message from the source node. For example, list $L_{C-A}$ is a list of next relay nodes of the present node A to broadcast a message from a source node (e.g., edge node C). The list can be an empty list when the present relay node is the last node on a broadcast path.

The domain master can distribute the FBRT 170 to each node in the home network domain 110, or distribute respective portion of the FBRT 170 to respective nodes. In the FIG. 1B example, the BRT 150B is a portion of the FBRT 170 corresponding to node A.

The multicast address table (MAT) 160B includes membership information of multicast groups in the domain 100. In the FIG. 1B example, the MAT 160B includes three columns: a MSID column, a source node column, and a list of next relay nodes column. Each row in the MAT 160B is an entry and corresponds to a multicast group, and stores information, such as MSID, source node, and a list of next relay nodes for the multicast group, respectively in the MSID column, the source node column, and the list of next relay nodes column. In an example, the MAT 160B includes other suitable information of the multicast group, such as a MULTICAST IP column to store MULTICAST IP of the multicast group.

The source node column stores a device identification of an edge node (also source node) from which multicast traffic of the multicast group enters the domain 100. The MSID column stores a multicast identifier assigned by the source node. It is noted that, in an example, each edge node independently manages the multicast identifiers, such that the multicast identifier in association with the device identification of the source node can uniquely identify a multicast group in the domain.

Further, in an embodiment, the list of next relay nodes stores a subset of the list of next relay nodes for the present node to broadcast a message from the source node. In an embodiment, the subset of the list is determined by the present node itself based on the BRT 150B according to a multicast control protocol.

In an embodiment of the disclosure, the edge node C also keeps track of membership for multicast flows. For example, for each multicast flow, the edge node C stores and tracks a group of nodes that receive the multicast flow.

Figure 1D:
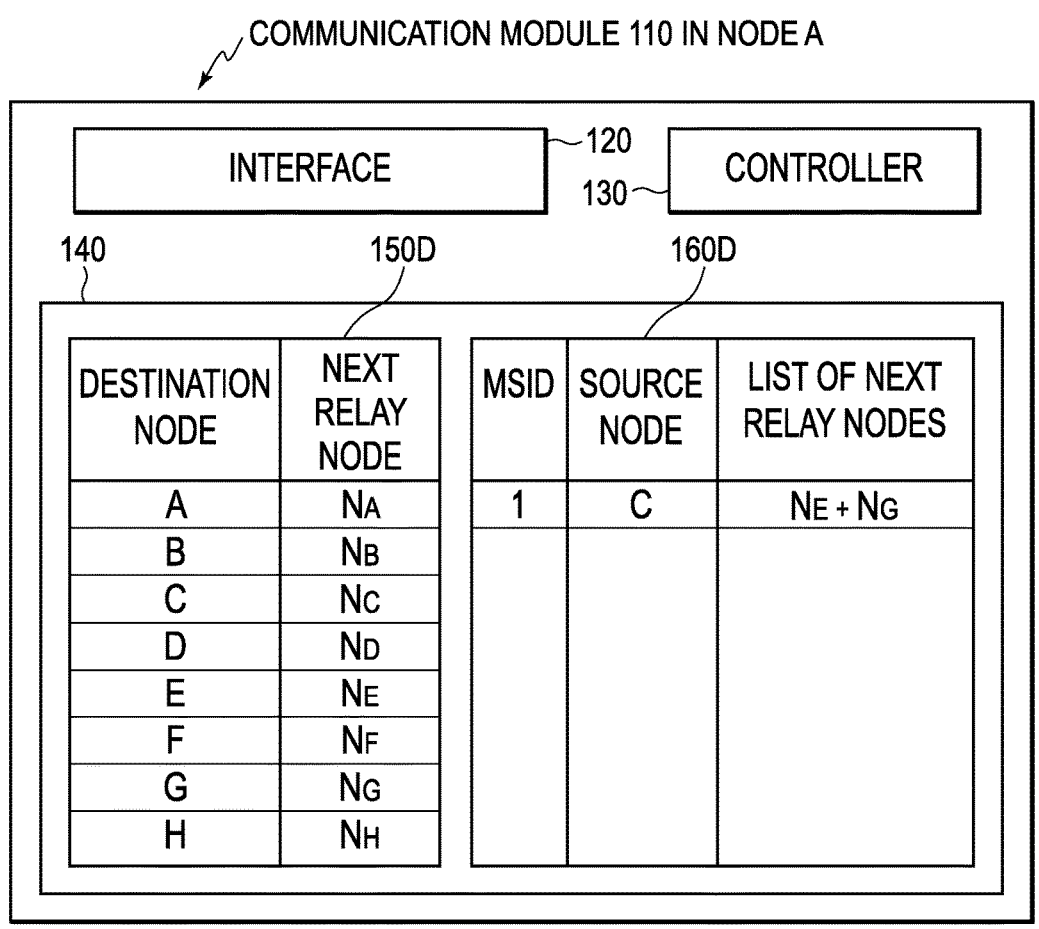
FIG. 1D shows another block diagram of a communication module of a node according to an embodiment of the disclosure.

FIG. 1D shows another block diagram of the communication module 110 at node A according to an embodiment of the disclosure. In the FIG. 1D example, the memory 140 stores a unicast routing table (URT) 150D, and a multicast address table (MAT) 160D. The URT 150D includes information to route unicast traffic. In the example, the URT 150D includes a column of destination node, and a column of next relay node. In each row of the URT 150, the destination node specifies a destination node for unicast traffic, and the next relay node stores the next relay node for routing the unicast traffic to the destination node.

The MAT 160D is similar to the MAT 160B in FIG. 1B. However, the list of next relay nodes in the MAT 160D is determined based on the information in the URT 150D. In an embodiment, the list of next relay nodes in the MAT 160D is determined based on a snapshot of the information in the URT 150D, such that when the information in the URT 150D is updated, the list of next relay nodes in the MAT 160D does not change. In another embodiment, when the information in the URT 150D is updated, the list of next relay nodes in the MAT 160D is updated accordingly. In an example, the MAT 160D includes other suitable information of the multicast group, such as MULTICAST IP of the multicast group.

Figure 2:
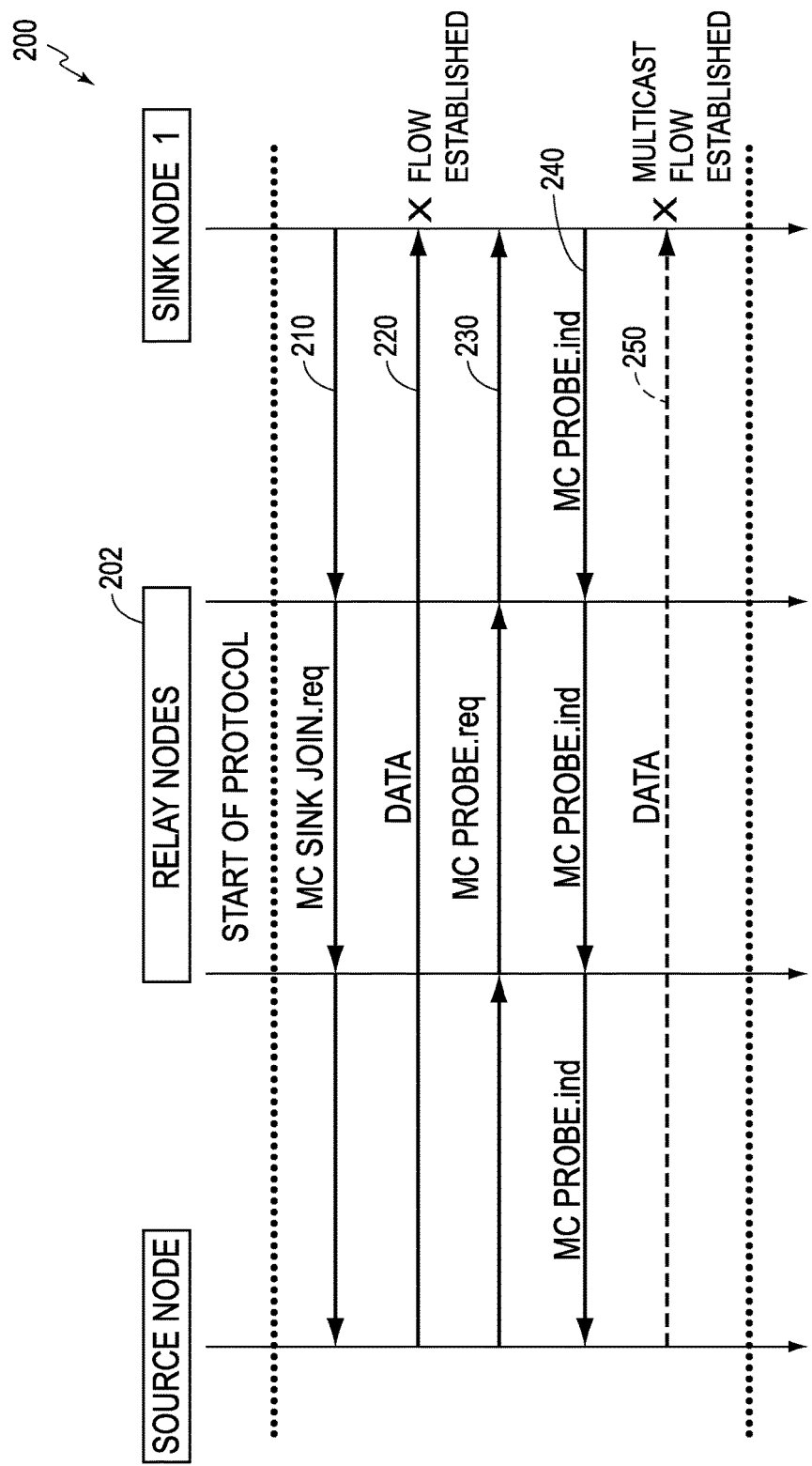
FIG. 2 shows a plot 200 of message exchange protocol for managing multicast traffic in a home network domain according to an embodiment of the disclosure.

FIG. 2 shows a plot 200 of an example message transmission in a domain, such as the domain 100, according to an example multicast control protocol. At a time, a node decides to join a multicast group that is identified by an IP address of a specific MULTICAST IP, and the node becomes sink node 1 of the multicast group in the domain. The sink node 1 can learn the multicast group and make decision to join the multicast group by any suitable technique. In an example, the multicast group corresponds to a TV channel. When the TV channel is selected, for example, from the PC in FIG. 1A, node E becomes sink node 1 of the multicast group.

In an embodiment, the sink node 1 checks membership information of the multicast group in the domain. In an example, the sink node 1 looks for an entry in MAT that has the specific MULTICAST IP. When such entry does not exist, the sink node 1 transmits a join request message (MC_SINK_JOIN.req) to join the multicast group, as shown by 210 in FIG. 2. The join request message includes suitable information, such as the specific MULTICAST IP of the multicast group and a device identification of the sink node 1.

In an embodiment, the join request message is broadcasted in the domain according to a broadcast routing tree rooted at the sink node 1. In an embodiment, the broadcast routing tree information is determined and distributed by the domain master. When a node receives the join request message, the node determines whether itself is a source node of the multicast group from which multicast traffic of the multicast group enters the domain. According to an embodiment of the disclosure, an edge node that communicates with external nodes to the domain 100 keeps track of information of the multicast traffic that can flow to the edge node. In an example, the edge node continually checks and filters the received traffic from the external nodes, and updates the information of the multicast traffic that can flow to the edge node.

In an example, when the node is an edge node, the node translate the LLC membership information of the multicast group into higher level membership information, and the node communicates with one or more external nodes using any suitable protocols, for example, relatively high level protocols, such as IGMP (v1/v2/v3) for Ipv4, MLD (v1/v2/ for Ipv6, and the like, to report the membership of the multicast group in the home network domain, and to determine whether the node is the entry point of the multicast traffic into the home network. When the node is the entry point of the multicast traffic, the node becomes the source node of the multicast traffic. When the node is not an edge node or the entry point of the multicast traffic, the node is one of the relay nodes 202.

According to an embodiment of the disclosure, because the join request message includes the device identification information of the sink node 1, the source node can start unicasting data in the multicast traffic to the sink node 1 when the join request message is received, as shown by 220. The unicast 220 reduces a delay time at the sink node 1 to receive the multicast traffic and improves user experience at the sink node 1.

In addition, in an embodiment, the source node transmits a probe request (MC_PROBE.req) in the domain. In an example, the source node broadcasts the probe request following a broadcast routing tree rooted at the source node. In an example, the source node transmits the probe request to the list of next relay nodes in the BRT corresponding to the source node. In another example, the source node unicasts the probe request to the sink node 1 according to the unicast table.

In an embodiment, the source node transmits a probe request message that includes the device identification of the sink node 1, and information to update the MAT at various nodes of the home network domain, such as the specific MULTICAST IP of the multicast group, the device identification of the source node, and a multicast identifier assigned by the source node.

Then, each relay node updates its MAT according to the probe request, and tags the probe request with branch information at the relay node. In an embodiment, the probe request is broadcasted in the domain according to the broadcast routing table that ensures each of the nodes in the home network domain receives the probe request. Thus, all the nodes in the domain update their respective MATs. In addition, the relay node tags branch information at the relay node, such as device identification of the relay node, and the like, in the probe request, and forwards the probe request further according to its BRT.

In another embodiment, the probe request is unicasted in the domain from the source node to the sink node 1 according to the unicast routing table. Thus, all the nodes along the unicast path from the source node to the sink node 1 update their respective MATs. In addition, in an example, each relay node tags branch information at the relay node, such as device identification of the relay node, and the like, in the probe request, and forwards the probe request further according to the unicast routing table at the relay node.

In an embodiment, when the sink node 1 receives the probe request, the sink node 1 determines a path based on the probe request and informs the path to relay nodes on the path. In an embodiment, when the probe request arrives at the sink node 1, the probe request is tagged with information of the path, such as a series of device identifications of the relay nodes on the path from the source node to the sink node 1. In an example, the sink node 1 determines the path, and sends a path indication message (MC_PROBE.ind) to the relay nodes on the path to inform the path. In an embodiment, the sink node 1 unicasts the path indication message hop by hop to the source node, as shown by 240 in FIG. 2. The sink node 1 can use other methods, such as broadcasts, and the like, to inform the relay nodes on the path.

In an embodiment, when relay nodes on the path receive path information, the relay nodes update MAT based on BRT. In an embodiment, when a relay node receives the path information, the relay node determines necessary branches of the BRT for the path, removes the unnecessary branches, and associates the necessary branches with the multicast group entry in MAT. In an example, a branch from which the path indication message comes is a necessary branch.

According to another aspect of the disclosure, the MAT at each relay node is suitable updated based on the information in the URT at the relay node during the routing of the probe request. When the sink node 1 receives the probe request, the relay nodes along the unicast path have updated their respective MATs, the sink node 1 can use any suitable methods to inform the source node and the relay nodes to start multicasting data to the sink node 1 through the computed path.

Then, the source node multicasts data for the multicast group, as shown by 250. In an example, the source node transmits the data according to the stored necessary branches for the multicast group entry in MAT, such as the list of nodes stored in the list of next relay nodes column in MAT 160B or the MAT 160D.

Figure 3:
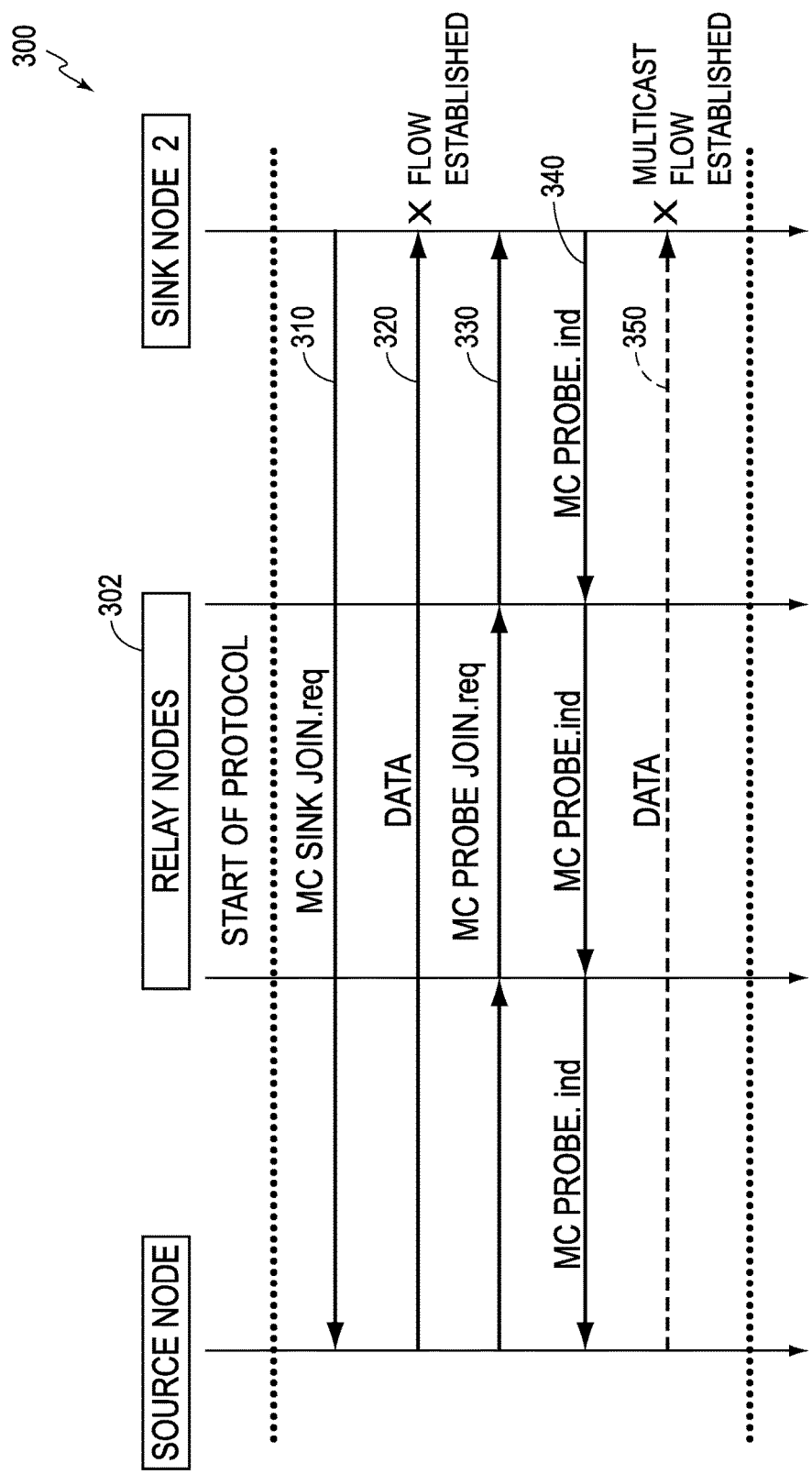
FIG. 3 shows another plot 300 of message exchange protocol for managing multicast traffic in a home network domain according to an embodiment of the disclosure.

FIG. 3 shows a plot 300 of message transmission example further to the plot 200 according to an embodiment of the disclosure. At a time, another node decides to join the multicast group that is identified by the specific MULTICAST IP, and becomes sink node 2 of the multicast group in the domain. In an example, the same TV channel is selected, for example, from the STB in FIG. 1A, thus node G becomes sink node 2 of the multicast group.

In an embodiment, the sink node 2 checks membership information of the multicast group in the domain. In an example, the sink node 2 looks for an entry in MAT corresponding to the specific MULTICAST_IP. Because the entry already exists and includes the device identification of the source node, the sink node 2 unicast a join request message (MC_SINK_JOIN.req) to the source node to join the multicast group, as shown by 310 in FIG. 3. The join request message includes suitable information, such as MULTICAST IP of the multicast group and a device identification of the sink node 2.

According to an embodiment of the disclosure, because the join request message includes the device identification information of the sink node 2, the source node can start unicasting data in the multicast traffic to the sink node 2 when the join request message is received, as shown by 320. The unicast reduces a delay time at the sink node 2 to receive the multicast traffic and improves user experience at the sink node 2.

In addition, in an embodiment, the source node broadcasts a probe request (MC_PROBE.req) in the domain according to the broadcast routing tree rooted at the source node. In an example, the source node transmits the probe request to the list of next relay nodes corresponding to the source node in its BRT.

Then, each relay node tags branch information at the relay node, such as device identification of the relay node, and the like, in the probe request, and forwards the probe request further according to its BRT.

In another embodiment, the probe request is unicasted in the domain from the source node to the sink node 2 according to the unicast routing table. Thus, each relay node along the unicast path from the source node to the sink node 2 updates its MAT based on the URT. In the FIG. 1D example, the next relay node (e.g., $N_E$) for sink node 1 (e.g., node E) and the next relay node (e.g., $N_G$) for sink node 2 (e.g., node G) are combined into a list. In an example, when $N_E$ and $N_G$ are different, the resulting list has both nodes; and when $N_E$ and $N_G$ are the same, the resulting list has one node.

In the example that uses information in the broadcast routing table, when the sink node 2 receives the probe request, the sink node 2 determines a path based on the probe request and informs relay nodes on the path. In an embodiment, when the probe request arrives at the sink node 2, the probe request is tagged with information of the path, such as a series of device identifications of the relay nodes on the path from the source node to the sink node 2. In an example, the sink node 2 determines the path, and sends a path indication message (MC_PROBE.ind) to the relay nodes on the path to inform the path. In an embodiment, the sink node 2 unicasts the path indication message hop by hop to the source node, as shown by 340 in FIG. 3. The sink node 2 can use other method, such as broadcasts, multiple unicasts and the like, to inform the relay nodes on the path.

When relay nodes on the path receive path information, the relay nodes update MAT based on BRT. In an embodiment, when a relay node receives the path information, the relay node determines necessary branches of the BRT for the path, removes the unnecessary branches, and associates the necessary branches with the multicast group entry in MAT. In an example, a branch from which the path indication message comes is a necessary branch.

In the example that uses information in the unicast routing table, when the sink node 2 receives the probe request, the relay nodes along the unicast path from the source node to the sink node 2 have updated their respective MATs, the sink node 2 can use any suitable methods to inform the source node and the relay nodes to start multicasting data to the sink node 2 through the computed path.

Then, the source node multicasts data for the multicast group, as shown by 350. In an example, the source node multicasts the data according to the list of next relay nodes column in MAT 160B or MAT 160D.

Figure 4:
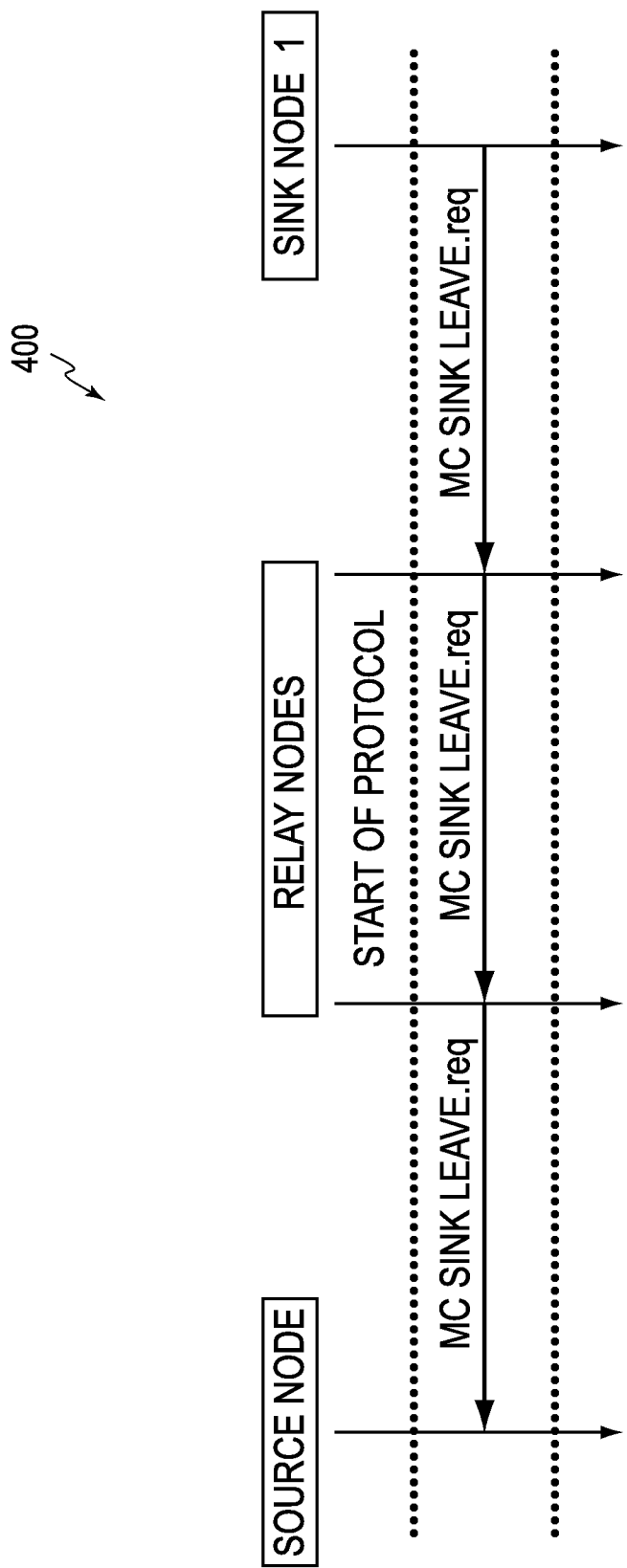
FIG. 4 shows another plot 400 of message exchange protocol for managing multicast traffic in a home network domain according to an embodiment of the disclosure.

FIG. 4 shows another plot 400 of message exchange for managing leaving request in a multicast control protocol according to an embodiment of the disclosure. For example, at a time, the sink node 1 decides to leave the multicast group that is identified by the specific MULTICAST IP. The sink node 1 unicasts a leave message (MCSINK_LEAVE.req) to the source node hop by hop. At each node, the relay node updates the list of next relay nodes column in the MAT 160B or the MAT 160D. In an example, the relay node removes a node from the list of next relay nodes column in MAT 160B or MAT 160D, when the node is not on a multicast path to other sink nodes, such as sink node 2.

In an embodiment the source node also removes the sink node 1 from a group of sink nodes of the multicast group and sends a confirmation message to the sink node 1 and stops sending data to the sink node 1. However, when the sink node 2 is still in the multicast group, the source node still multicasts data of the multicast group to the sink node 2 according to its MAT.

Figure 5:
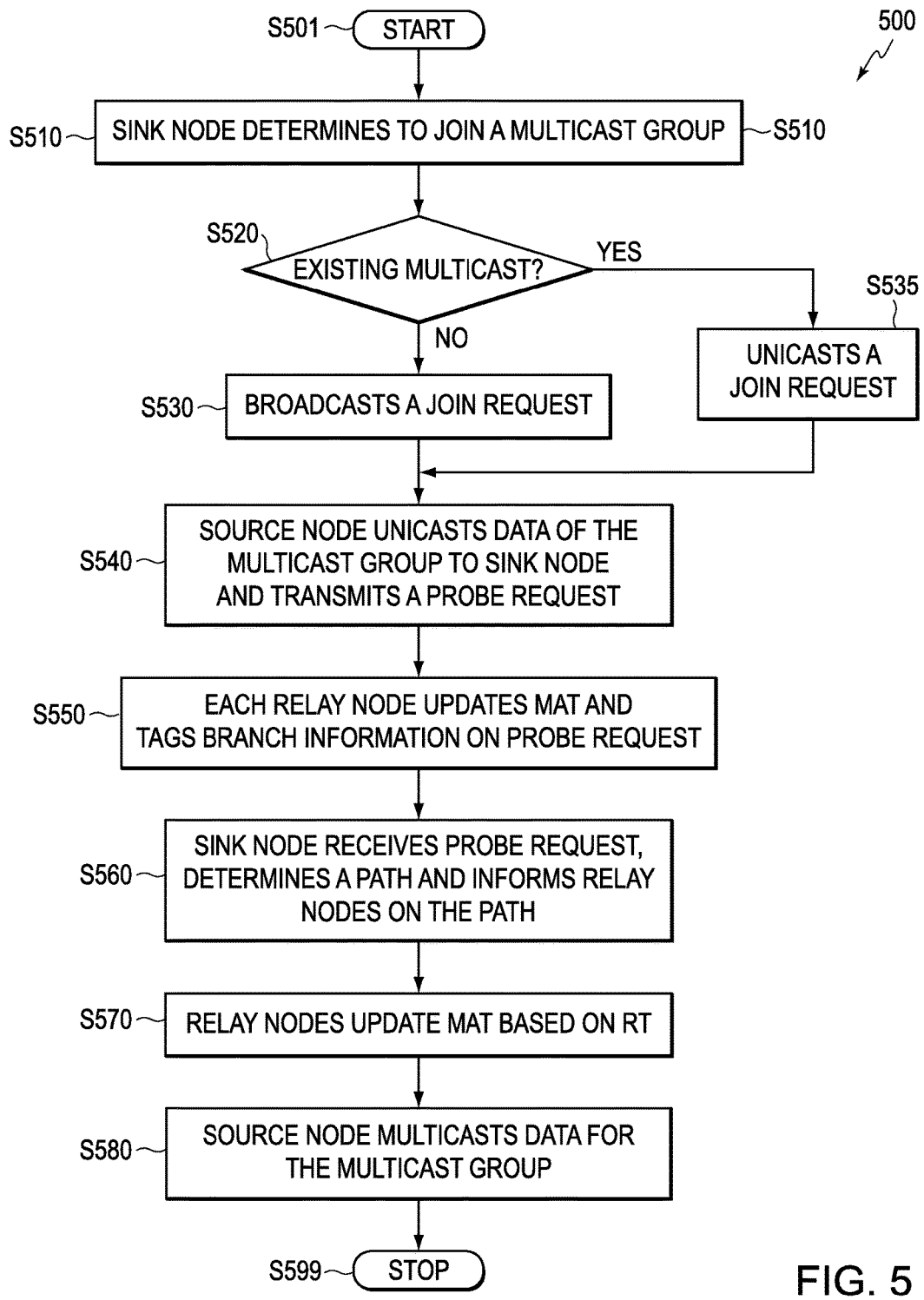
FIG. 5 shows a flow chart outlining a process for managing multicast traffic in a home network domain according to an embodiment of the disclosure.

FIG. 5 shows a flow chart outlining a process example 500 for managing multicast traffic in a domain, such as a G.hn domain, according to an embodiment of the disclosure. The process starts at S501 and proceeds to S510.

At S510, a node in the domain determines to join a multicast group having a specific MULTICAST_IP. The node becomes a sink node for multicast traffic of the multicast group.

At S520, the sink node determines whether membership of the multicast group exists in the domain. In an embodiment, each node in the domain stores membership information of all the multicast groups in the domain. In an example, each node in the domain stores a multicast address table (MAT). Each entry in the MAT corresponds to a multicast group and stores membership information corresponding to the multicast group, such as MULTICAST IP of the multicast group, device identification of a source node where multicast traffic of the multicast group enters the domain, a multicast identifier assigned to the multicast group by the source node. When an entry corresponding to the specific MULTICAST IP exists, the process proceeds to S535, otherwise, the process proceeds to S530.

At S530, the sink node broadcasts a join request. In an embodiment, the sink node broadcasts a join request message that includes information of the join request, such as the specific MULTICAST IP of the multicast group, and its own device identification.

At S535, because an entry corresponding to the specific MULTICAST IP exists in the MAT, the entry includes device identification of the source node, the sink node unicasts a join request to the source node of the multicast group.

At S540, the source node unicasts data for the multicast group to the sink node to avoid delays. In addition, the source node transmits a probe request. In an embodiment, the source node broadcasts a probe request message that includes the device identification of the sink node, and information to update the MAT at various nodes of the home network domain, such as the specific MULTICAST_IP of the multicast group, the device identification of the source node, and a multicast identifier assigned by the source node.

It is noted that the source node broadcasts the probe request according to the broadcast routing tree rooted at the source node, such as information in the broadcast routing table at the source node.

In another embodiment, the source node unicasts the probe request to the sink node according to information in a unicast routing table.

At S550, each relay node updates its MAT according to the probe request. According to an aspect of the disclosure, the relay node tags the probe request with branch information at the relay node. In an embodiment, the probe request is broadcasted in the domain according to the broadcast routing table that ensures each of the nodes in the home network domain receives the probe request. Thus, all the nodes in the home network domain update their respective MAT. In addition, the relay node tags branch information at the relay node, such as device identification of the relay node, and the like, in the probe request, and forwards the probe request further according to the broadcast routing table. In another embodiment of the disclosure, the probe request is unicasted in the domain according to the unicast routing table. Then, each relay node on the unicast path combines the next relay node corresponding to the sink node in the unicast routing table with the list of next relay nodes of the multicast group to generate a new list to update the MAT.

At S560, the sink node receives the probe request, determines a path based on the probe request and informs relay nodes on the path. In an embodiment, when the probe request arrives at the sink node, the probe request is tagged with information of the path, such as a series of device identifications of the relay nodes on the path from the source node to the sink node. In an example, the sink node determines the path, and sends a path indication message to the relay nodes on the path to inform the path. In an embodiment, the sink node unicasts the path indication message hop by hop to the source node. The sink node can use other methods, such as broadcasts, and the like, to inform the relay nodes on the path.

At S570, when relay nodes on the path receive path information, the relay nodes update MAT based on the routing table at the relay node. In an embodiment, when a relay node receives the path information, the relay node determines necessary branches of the BRT for the path, and associates the necessary branches in the entry of the multicast group in MAT. In an example, a branch from which the path indication message comes is a necessary branch. In another embodiment, when a relay node receives the path information, the relay node validates the entries computed from unicast routing tables of the multicast group in MAT.

At S580, the source node multicasts data for the multicast group. In an example, the source node broadcasts the data according to the list of next relay nodes in the entry of the multicast group in MAT. Then the process proceeds to S599 and terminates.

According to an aspect of the disclosure, the process 500 can be suitable modified. In an example that uses information in the unicast routing table to determine the multicast paths, MAT update can be computed at S560 and validated in each relay node at S570.

While aspects of the present disclosure have been described in conjunction with the specific embodiments thereof that are proposed as examples, alternatives, modifications, and variations to the examples may be made. For example, one or more steps of processes described above may be performed in a different order (or concurrently) and still achieve desirable results. Accordingly, embodiments as set forth herein are intended to be illustrative and not limiting. There are changes that may be made without departing from the scope of the claims set forth below.

What is claimed is:

1. A method, comprising:
learning a topology of a domain to determine broadcast routing trees in the domain by a master node of the domain;
storing, at a first node of the domain, the broadcast routing trees;
forwarding, from the first node to next nodes, a probe message transmitted from a second node in response to a request from a third node;
receiving a path indication message unicasted hop by hop from the third node in a reverse order of a path determined by the third node;
storing, at the first node, a multicast address table including a list of nodes in association with a multicast flow; and
determining the list of nodes based on a snapshot of information of a unicast routing table such that the list of nodes included in the multicast address table does not change when the information in the unicast routing table is updated.

2. The method of claim 1, further comprising:
storing, at the first node of the domain, the unicast routing table including the information to route unicast traffic for transmitting messages in the domain.

3. The method of claim 2, wherein the unicast routing table associates one of the next nodes with the third node.

4. The method of claim 2, wherein the third node joins a group to receive the multicast flow that enters the domain from the second node.

5. The method claim 4, further comprising:
combining one of the next nodes into the list of nodes in association with the multicast flow.

6. The method of claim 4, further comprising:
receiving a leave message informing the third node leaving the group; and
updating the list of nodes in association with the multicast flow in response to the leave message.

7. The method of claim 1, wherein forwarding, from the first node to the next nodes, the probe message further comprises:
including an identification of the first node in the probe message.

8. The method of claim 7, further comprising:
receiving the path indication message informing the path determined by the third node based on the identification included in the probe message.

9. An apparatus, comprising:
a controller configured to learn a topology of a domain to determine broadcast routing trees in the domain by a master node of the domain and determine a list of nodes based on a snapshot of information of a unicast routing table such that the list of nodes included in a multicast address table does not change when the information in the unicast routine table is updated;
a memory configured to store, at a first node of the domain, the broadcast routing trees and store, at the first node, the multicast address table including the list of nodes in association with a multicast flow; and
an interface configured to forward, from the first node to next nodes, a probe message transmitted from a second node in response to a request from a third node and receive a path indication message unicasted hop by hop from the third node in a reverse order of a path determined by the third node.

10. The apparatus of claim 9, wherein the memory is further configured to store, at the first node of the domain, the unicast routing table including the information to route unicast traffic for transmitting messages in the domain.

11. The apparatus of claim 10, wherein the unicast routing table associates one of the next nodes with the third node.

12. The apparatus of claim 10, wherein the third node joins a group to receive the multicast flow that enters the domain from the second node.

13. The apparatus of claim 12, wherein the controller is further configured to combine one of the next nodes into the list of nodes in association with the multicast flow.

14. The apparatus of claim 12, wherein the interface is further configured to receive a leave message informing the third node leaving the group and the controller is further configured to update the list of nodes in association with the multicast flow in response to the leave message.

15. The apparatus of claim 9, wherein the interface is further configured to include an identification of the first node in the probe message.

16. The apparatus of claim 15, wherein the interface is further configured to receive the path indication message informing the path determined by the third node based on the identification included in the probe message.

* * * * *